(12) United States Patent
Skidmore et al.

(10) Patent No.: US 11,271,775 B2
(45) Date of Patent: Mar. 8, 2022

(54) TECHNOLOGIES FOR HAIRPINNING NETWORK TRAFFIC

(71) Applicant: Intel Corporation, Santa Clara, CA (US)

(72) Inventors: Donald Skidmore, Portland, OR (US); Joshua Hay, Hillsboro, OR (US); Anjali Singhai Jain, Portland, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 16/023,771

(22) Filed: Jun. 29, 2018

(65) Prior Publication Data
US 2019/0052480 A1  Feb. 14, 2019

(51) Int. Cl.
*H04L 12/46* (2006.01)
*H04L 49/351* (2022.01)
(Continued)

(52) U.S. Cl.
CPC ...... *H04L 12/4616* (2013.01); *G06F 9/45558* (2013.01); *H04L 12/4625* (2013.01);
(Continued)

(58) Field of Classification Search
CPC ............. H04L 12/4616; H04L 12/4625; H04L 49/351; H04L 49/70; H04L 49/65;
(Continued)

(56) References Cited

U.S. PATENT DOCUMENTS

| | | | |
|---|---|---|---|
| 2008/0095047 A1* | 4/2008 | Skalecki | H04L 41/0668 370/225 |
| 2012/0016970 A1* | 1/2012 | Shah | G06F 16/23 709/220 |

(Continued)

FOREIGN PATENT DOCUMENTS

| | | | | |
|---|---|---|---|---|
| CN | 105610737 A | * | 5/2016 | |
| EP | 3588869 A1 | * | 1/2020 | ............. H04L 49/70 |

OTHER PUBLICATIONS

Extended European search report for European patent application No. 19176608.8, dated Oct. 9, 2019 (7 pages).
(Continued)

*Primary Examiner* — Benjamin H Elliott, IV
(74) *Attorney, Agent, or Firm* — Compass IP Law PC

(57) ABSTRACT

Technologies for hairpinning network traffic include a compute device with a network interface controller (NIC) configured to receive, by a virtual Ethernet port aggregator (VEPA) agent of a media access control (MAC) of the NIC, a network packet from a virtual machine (VM). The VEPA agent is configured to transmit the received network packet to an agent deployed on an accelerator device of the NIC and the agent is configured to forward the received network packet to a virtual Ethernet bridge (VEB) hairpin agent of the accelerator device. The VEB hairpin agent is configured to determine whether a target destination of the network packet corresponds to another VM, return the received network packet to the agent deployed the accelerator device. The agent is further configured to forward the received network packet to the VEPA agent, which is further configured to transmit the received network packet to the other VM.

26 Claims, 3 Drawing Sheets

(51) Int. Cl.
　　　*H04L 49/00*　　(2022.01)
　　　*G06F 9/455*　　(2018.01)
　　　*H04L 49/65*　　(2022.01)
(52) U.S. Cl.
　　　CPC ............ *H04L 49/351* (2013.01); *H04L 49/70* (2013.01); *G06F 2009/45595* (2013.01); *H04L 49/65* (2013.01)
(58) Field of Classification Search
　　　CPC . H04L 12/462; H04L 12/4641; H04L 61/256; H04L 29/12386; H04L 61/2521; G06F 9/45558; G06F 2009/45595
　　　See application file for complete search history.

(56) References Cited

U.S. PATENT DOCUMENTS

| | | | |
|---|---|---|---|
| 2012/0027014 A1* | 2/2012 | Mack-Crane | H04L 12/4666 370/390 |
| 2012/0291025 A1* | 11/2012 | Kidambi | H04L 49/70 718/1 |
| 2012/0317566 A1* | 12/2012 | Santos | H04L 45/742 718/1 |
| 2014/0294009 A1* | 10/2014 | Sahara | H04L 61/2514 370/392 |
| 2015/0055658 A1* | 2/2015 | Abidi | H04L 12/465 370/401 |
| 2015/0358231 A1* | 12/2015 | Zhang | H04L 49/70 370/392 |
| 2016/0119256 A1* | 4/2016 | Wang | H04L 49/70 370/401 |
| 2016/0232019 A1* | 8/2016 | Shah | G06F 9/45558 |
| 2016/0315879 A1* | 10/2016 | Morris | H04L 49/254 |
| 2019/0052480 A1* | 2/2019 | Skidmore | H04L 12/4625 |

OTHER PUBLICATIONS

European First Office Action for Patent Application No. 19176608.8, dated Nov. 27, 2020, 4 pages.

* cited by examiner

TECHNOLOGIES FOR HAIRPINNING NETWORK TRAFFIC

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). Under certain conditions, network traffic may be generated by the same computing device that is intended to receive the generated network traffic. Oftentimes, such conditions occur as a result of interactions between virtual switching environments in a hypervisor and the first layer of the physical switching infrastructure.

To facilitate such communications, various edge virtual bridging technologies have been developed such that the network traffic is hairpinned back to the source computing device (i.e., the network traffic makes a U-turn and goes back the same way it came). In one example, virtual Ethernet bridge (VEB) technology may employ a virtual switch or be embedded in hardware at the media access control (MAC) sublayer to hairpin network traffic. However, due to the hairpinning being performed at the MAC layer (i.e., before reaching an offload operation capable component), VEB implementations typically lack offload capabilities (e.g., network management, monitoring, security, etc.). To address such shortcomings, virtual Ethernet port aggregator (VEPA) technology has been developed. However, VEPA technology provides bridging support using an adjacent, external network switch, which requires network traffic to leave the source computing device, resulting in latency and wasted bandwidth. Furthermore, such solutions may not be supported on all network switches, such as top of rack (ToR) switches which are commonly used in large cloud implementations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
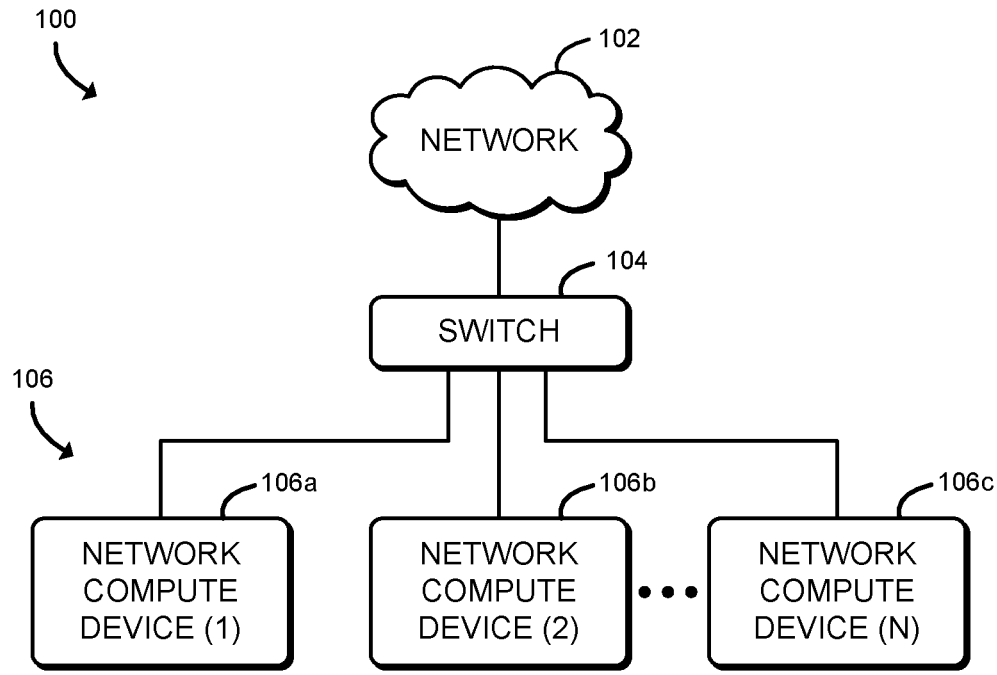
FIG. 1 is a simplified block diagram of at least one embodiment of a system for hairpinning network traffic.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for hairpinning network traffic includes a switch 104 communicatively coupled to multiple network compute devices 106 (e.g., in a cloud environment, a data center, etc.). The switch 104 is configured to receive network packets originating outside of the network 102, commonly referred to as north-south network traffic. The switch 104 is additionally configured to route traffic to other network compute devices 106, which may be directly coupled to the switch 104 or indirectly coupled via another switch 104, commonly referred to as east-west network traffic. As shown in the illustrative system 100, the network compute devices 106 include a first network compute device 106 designated as network compute device (1) 106a, a second network compute device 106 designated as network compute device (2) 106b, and a third network compute device 106 designated as network compute device (N) 106c (e.g., in which the network compute device (N) 106c represents the "Nth" network compute device 106 and "N" is a positive integer). It should be appreciated that while only a single switch 104 is illustratively shown, multiple switches 104 may be employed in other embodiments.

Upon receipt of a network packet, the switch 104 is configured to identify which network compute device 106 to forward the received network packet to. The routing decision logic performed by the switch 104 may be based on one or more operations that are to be performed on the network packet (e.g., a data processing service) or are to be taken in response to having received the network packet (e.g., lookup data based on query parameters of the network packet, store data in a payload of the network packet, etc.). Oftentimes, once the network packet has been received by one network compute device 106, the one or more operations may be carried out by multiple network compute devices 106 and/or multiple guests (e.g., guest operating systems) executing on one or more virtual machines (VMs) deployed on one of the network compute devices 106.

In such embodiments in which the network traffic is to be routed to its source (e.g., transmitted between VMs deployed on the same network compute device 106), the network compute device 106 is configured to route such network traffic internally, while still supporting offload functionality. To do so, unlike present solutions, such as those that employ a virtual switch at the media access control (MAC) sublayer (e.g., VEB) to hairpin such network traffic, which inherently do not support offload functionality, the network compute device 106 is configured to employ VEPA at the MAC layer. Additionally, the network compute device 106 is configured to deploy a hairpin agent (see, e.g., the virtual Ethernet bridge (VEB) hairpin agent 314 of FIG. 3) on an accelerator device (see, e.g., the accelerator device 310 of FIG. 3) to perform the network traffic hairpinning. Accordingly, further unlike present solutions, such as those existing solutions which require routing the network traffic through an adjacent, external network switch (e.g., the switch 104) to hairpin such network traffic (e.g., using virtual Ethernet port aggregator (VEPA)), such network traffic does not need to be transmitted to a device external to the network compute device 106, and offload functionality is still supported.

Figure 2:
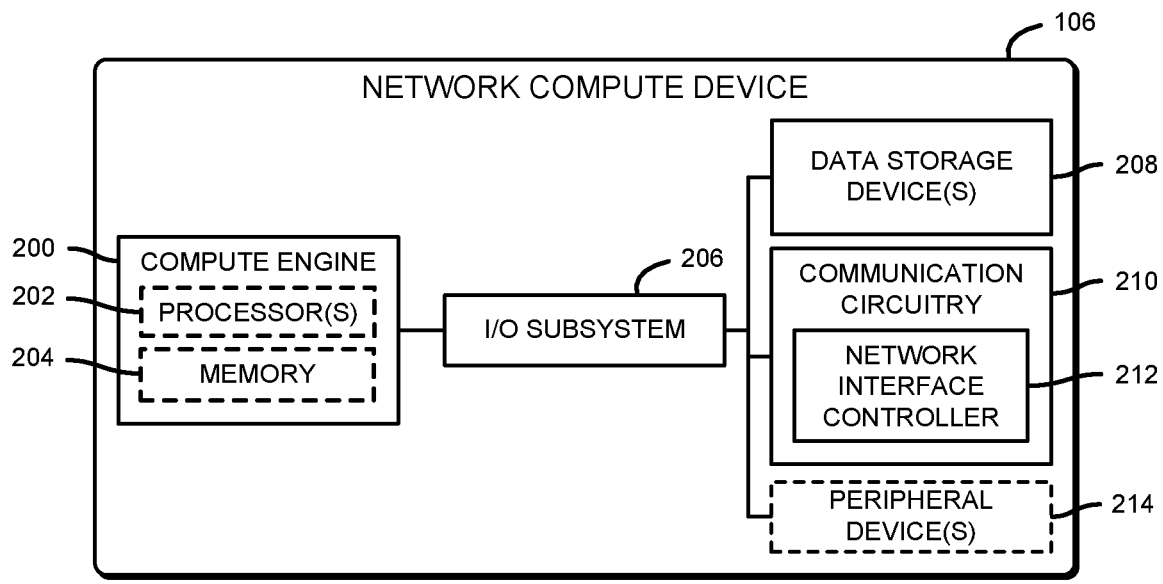
FIG. 2 is a simplified block diagram of at least one embodiment of the network computing device of the system of FIG. 1.

The network compute device 106 may be embodied as any type of computation or computer device capable of performing the functions described herein, including, without limitation, a server (including, e.g., stand-alone server, rack-mounted server, blade server, etc.), a sled (e.g., a compute sled, an accelerator sled, a storage sled, a memory sled, etc.), an enhanced network interface controller (NIC) (e.g., a host fabric interface (HFI)), a distributed computing system, or any other combination of compute/storage device(s) capable of performing the functions described herein. Referring now to FIG. 2, the illustrative network compute device 106 includes a compute engine 200, an I/O subsystem 206, one or more data storage devices 208, communication circuitry 210, and, in some embodiments, one or more peripheral devices 214. It should be appreciated that the network compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 204 may be embodied as any type of volatile or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the network compute device 106 via the I/O subsystem 206, which may be embodied as circuitry and/or components to facilitate input/output operations with the processor 202, the memory 204, and other components of the network compute device 106. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the network compute device 106, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the network compute device 106 and the switch 104, as well as any network communication enabling devices, such as an access point, router, etc., to allow communication to/from the network compute device 106. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 210 may include specialized circuitry, hardware, or combination thereof to perform pipeline logic (e.g., hardware-based algorithms) for performing the functions described herein, including processing network packets, making routing decisions, performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the network compute device 106 (e.g., incorporated on a single integrated circuit chip along with a processor 202, the memory 204, and/or other components of the network compute device 106). Alternatively, in some embodiments, the specialized circuitry, hardware, or combination thereof may be embodied as one or more discrete processing units of the network compute device 106, each of which may be capable of performing one or more of the functions described herein.

The illustrative communication circuitry 210 includes a network interface controller (NIC) 212, also commonly referred to as a host fabric interface (HFI) in some embodiments (e.g., high-performance computing (HPC) environments). The NIC 212 may be embodied as one or more add-in-boards, daughtercards, network interface cards, controller chips, chipsets, or other devices that may be used by the network compute device 106. In some embodiments, the NIC 212 may be embodied as part of a system-on-a-chip (SoC) that includes one or more processors, or included on a multichip package that also contains one or more processors. In some embodiments, the NIC 212 may include other components which are not shown, such as a local processor, an accelerator device (e.g., any type of specialized hardware on which operations can be performed faster and/or more efficiently than is possible on the local general-purpose processor), and/or a local memory local to the NIC 212. In such embodiments, the local processor and/or the accelerator device of the NIC 212 may be capable of performing one or more of the functions described herein.

The one or more peripheral devices 214 may include any type of device that is usable to input information into the network compute device 106 and/or receive information from the network compute device 106. The peripheral devices 214 may be embodied as any auxiliary device usable to input information into the network compute device 106, such as a keyboard, a mouse, a microphone, a barcode reader, an image scanner, etc., or output information from the network compute device 106, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the network compute device 106 may depend on, for example, the type and/or intended use of the network compute device 106. Additionally or alternatively, in some embodiments, the peripheral devices 214 may include one or more ports, such as a USB port, for example, for connecting external peripheral devices to the network compute device 106.

Referring back to FIG. 1, the switch 104 may be embodied as any type of switch, such as a disaggregated switch, a rack-mounted switch, a standalone switch, a fully managed switch, a partially managed switch, a full-duplex switch, and/or a half-duplex communication mode enabled switch. The switch 104 may be positioned as a top-of-rack (ToR) switch, an end-or-rack (EoR) switch, a middle-of-rack (MoR) switch, or any position in which the switch 104 may be configured to perform the functions described herein. For example, in some embodiments, the switch 104 may be configured as a managed smart switch that includes a set of management features, such as may be required for the switch 104 to perform the functions as described herein.

The network 102 may be embodied as any type of wired or wireless communication network, including but not limited to a wireless local area network (WLAN), a wireless personal area network (WPAN), an edge network (e.g., a multi-access edge computing network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 102 may serve as a centralized network and, in some embodiments, may be communicatively coupled to another network (e.g., the Internet). Accordingly, the network 102 may include a variety of other virtual and/or physical network computing devices (e.g., routers, switches, network hubs, servers, storage devices, compute devices, etc.), as needed to facilitate the transmission of network traffic through the network 102.

Figure 3:
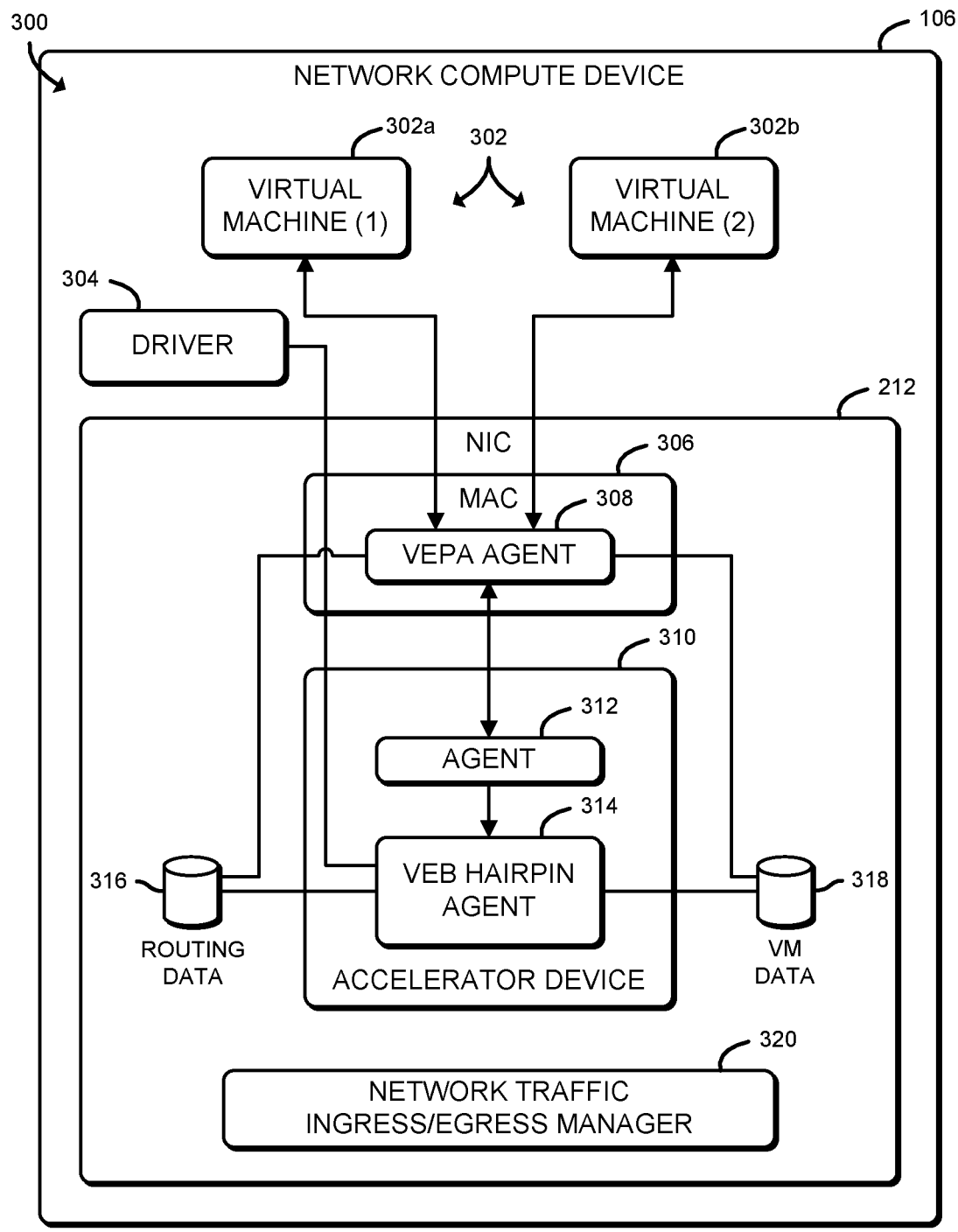
FIG. 3 is a simplified block diagram of at least one embodiment illustrating the network computing device of the system of FIG. 1 hairpinning network traffic local to the network computing device of FIGS. 1 and 2.

Referring now to FIG. 3, in an illustrative embodiment, the network compute device 106 establishes an environment 300 for hair-pinning network traffic local to the network compute device 106 during operation. The illustrative environment 300 includes VMs 302, a driver 304, and a network traffic ingress/egress manager 320, as well as the NIC 212 of FIG. 2. The various components of the environment 300 may be embodied as hardware, firmware, software, or a combination thereof. It should be appreciated that, in such embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the compute engine or other components of the device edge network computing device 104. It should be appreciated that the device edge network computing device 104 may include other components, sub-components, modules, sub-modules, logic, sub-logic, and/or devices commonly found in a computing device, which are not illustrated in FIG. 3 for clarity of the description.

The illustrative virtual machines 302 includes a first VM 302 designated as VM (1) 302a and a second VM 302 designated as VM 302b, each of which are configured to perform certain operations or services. It should be appreciated that while the illustrative VMs 302 only includes two VMs 302, the network compute device 106 may include multiple additional VMs in other embodiments. While illustratively shown as VMs 302, the network compute device 106 may include multiple containers in addition to or as an alternative to the VMs 302, in other embodiments. The driver 304 may be embodied as any type of device driver capable of performing the functions described herein, including managing the operational configuration of the VEB hairpin agent 314. It should be appreciated that, unlike present technologies in which a VEB agent is configured by a driver at the MAC layer, the driver 304 is configured to operate in VEPA mode and manage the configuration of the VEB hairpin agent 314 local to the accelerator device 310.

The illustrative NIC 212 includes a MAC 306 with a VEPA agent 308, and an accelerator device 310. The MAC 306 may be embodied as any type of software, hardware, firmware, or any combination thereof (e.g., MAC circuitry 306) capable of performing the functions described herein at the MAC sublayer. The VEPA agent 308 is configured to perform VEPA related routing functionality consistent with typical VEPA operation at the MAC layer. The illustrative accelerator device 310 includes an agent 312 and a VEB hairpin agent 314. The accelerator device 310 may be embodied as any type of specialized hardware on which operations can be performed faster and/or more efficiently than is possible on a more general-purpose processor. For example, the accelerator device 310 may be embodied as, but not limited to, an FPGA, an ASIC, or other specialized circuitry. However, it should be appreciated that, in alternative embodiments, the VEB hairpin agent 314 may be executed on a general purpose processor capable of performing any bump in the wire offload solution for processing east-west network traffic.

The agent 312 is configured to function as an interfacing agent between the VEPA agent 308 and the VEB hairpin agent 314 (i.e., consistent with behavior exhibited for north-south network traffic). Accordingly, the agent 312 is configured to execute in both the ingress and egress directions. The VEB hairpin agent 314 is configured to return the applicable network traffic to the VEPA agent 308 (i.e., via the agent 312). To do so, the VEB hairpin agent 314 is configured to track identifying data of the VMs 302 such that the VEB hairpin agent 314 can determine which network traffic is to be hairpinned. In some embodiments, the identifying data may be stored in the routing data.

As described previously, the various components of the environment 300 may be embodied as hardware, firmware, software, or a combination thereof. As such, in some embodiments, one or more of the VEPA agent 308, the agent 312, the VEB hairpin agent 314, and the network traffic ingress/egress manager 320 may be embodied as circuitry or collection of electrical devices (e.g., VEPA agent circuitry 308, accelerator device agent circuitry 312, VEB hairpin agent circuitry 314, network traffic ingress/egress management circuitry 320, etc.). It should be appreciated that, in such embodiments, one or more of the VEPA agent circuitry 308, the accelerator device agent circuitry 312, the VEB hairpin agent circuitry 314, and the network traffic ingress/ egress management circuitry 320 may form a portion of one or more of the compute engine 200, or more particularly processor 202 (i.e., core) thereof, the I/O subsystem 206, the communication circuitry 210, or more particularly the NIC 212 as illustratively shown, and/or other components of the network compute device 106.

In the illustrative environment 300, the network compute device 106 additionally includes routing data 316 for storing routing information and VM data 318 for storing data corresponding to the VMs 302 (e.g., configuration information, an associated Internet Protocol (IP) address, etc.), each of which may be accessed by the various components and/or sub-components of the network compute device 106. Additionally, it should be appreciated that in some embodiments the data stored in, or otherwise represented by, each of the routing data 316 and the VM data 318 may not be mutually exclusive relative to each other. For example, in some implementations, data stored in the routing data 316 may also be stored as a portion of the VM data 318. As such, although the various data utilized by the network compute device 106 is described herein as particular discrete data, such data may be combined, aggregated, and/or otherwise form portions of a single or multiple data sets, including duplicative copies, in other embodiments.

As illustratively shown, at least the VEPA agent 308 and the VEB hairpin agent 314 are configured to access the routing data 316 and the VM data 318. For example, the VEPA agent 308 is configured to identify a target destination for the network packets received from the VMs 302. To do so, the VEPA agent 308 may be configured to utilize information associated with a flow of the network packet, a workload type of the network packet, an originating source of the network packet, an output of a packet processing operation performed on the received network packet, and/or other information of the network packet, to identify the target destination for the network packet. Such identifying target destination identifying information may be stored in and/or retrieved from the routing data 316 and/or the VM data 318. Additionally, the VEPA agent 308 is configured to insert a target destination identifier (e.g., a corresponding IP Address) into the network packets received from the VMs 302.

The VEB hairpin agent 314 is configured to be notified or otherwise be capable of identifying when a new VM is instantiated, as well as identifying information thereof, which may be stored in the VM data 318. In some embodiments, the VM data 318 may include additional and/or alternative VM configuration information, such as may be usable by the VM instances 302. Accordingly, while illustratively shown as being stored in the NIC 212, it should be further appreciated that, in some embodiments, at least portion of the VM data 318 and/or the routing data 316 may be stored local to the host (i.e., external to the NIC 212) in a direct-memory accessible storage location.

Additionally, the VEB hairpin agent 314 is configured to determine which network packets are to be routed external to the network compute device 106 and which network packets are to be hairpinned based on the target destination identifier of the network packet (e.g., as inserted by the VEPA agent 308). To do so, the VEB hairpin agent 314 is configured to determine whether the target destination corresponds to an external computing device (e.g., accessible via the switch 104) or to a local destination (e.g., one of the VMs 302) of the network compute device 106. Accordingly, the VEB hairpin agent 314 is further configured to access routing information, which may be stored in the routing data 316 in some embodiments, and/or the VM data 318 in other embodiments. In other words, the VEB hairpin agent 314 is configured to determine whether to hairpin a network packet based on a target destination (e.g., as identifiable using an IP address) of the network packet and data stored in the routing data 316 and/or the VM data 318.

The network traffic ingress/egress manager 320, which may be embodied as hardware, firmware, software, virtualized hardware, emulated architecture, and/or a combination thereof as discussed above, is configured to receive inbound and route/transmit outbound network traffic. To do so, the network traffic ingress/egress manager 320 is configured to facilitate inbound/outbound network communications (e.g., network traffic, network packets, network flows, etc.) to and from the network compute device 106. For example, the network traffic ingress/egress manager 320 is configured to manage (e.g., create, modify, delete, etc.) connections to physical and virtual network ports (i.e., virtual network interfaces) of the network compute device 106, as well as the ingress/egress buffers/queues associated therewith.

Figure 4:
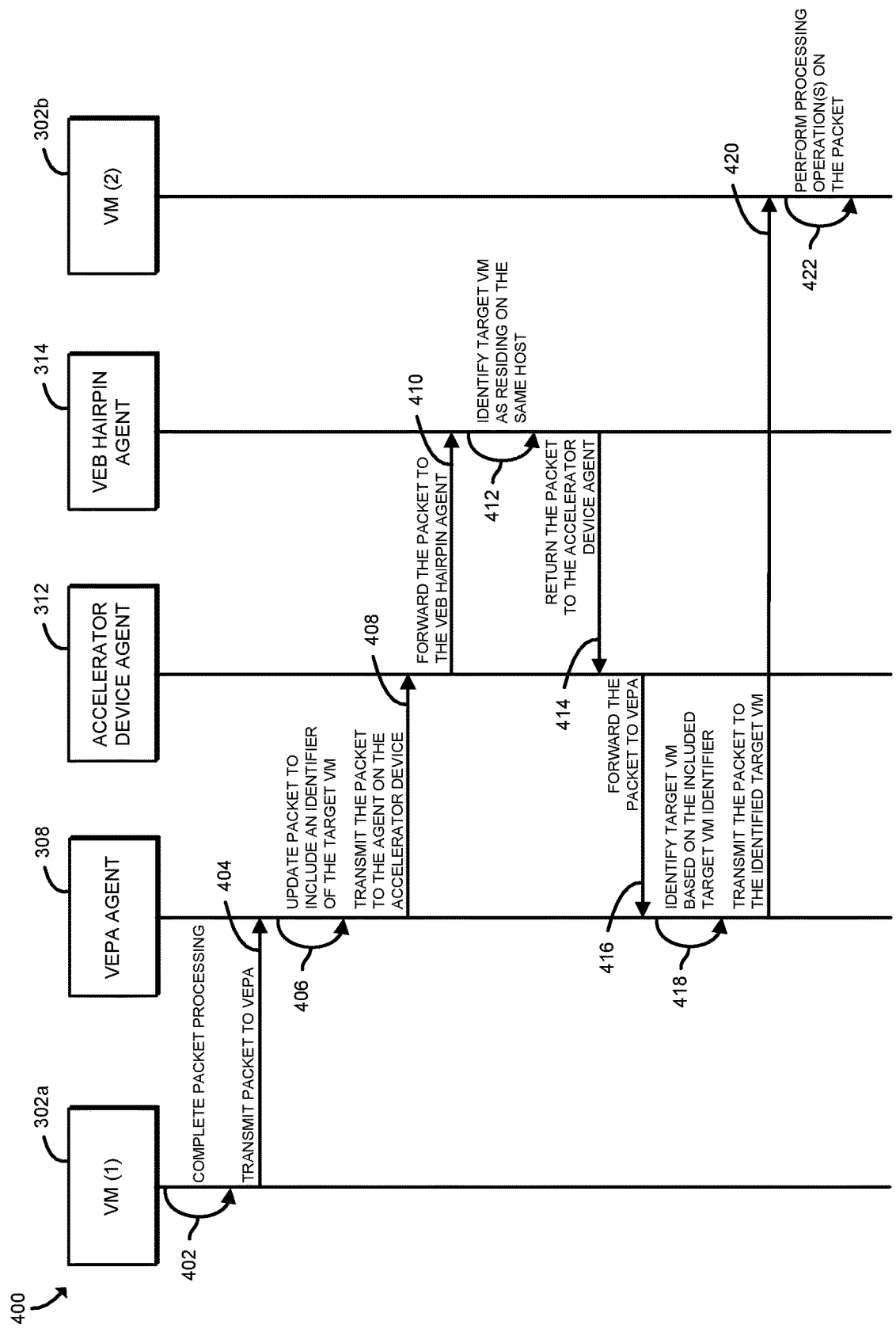
FIG. 4 is a simplified communication flow diagram of at least one embodiment for hairpinning a network packet between a source virtual machine and a target virtual machine of the network computing device of FIGS. 1-3.

Referring now to FIG. 4, an embodiment of a communication flow 400 for hairpinning a network packet that includes the VM (1) 302a, VEPA agent 308, the accelerator device agent 312, the VEB hairpin agent 314, and the VM (2) 302b of the network compute device 106 of FIG. 3. The illustrative communication flow 400 includes a number of data flows, some of which may be executed separately or together, depending on the embodiment. In data flow 402, the VM (1) 302a completes a packet processing operation that results in an output of a network packet intended for transmission to a target destination. It should be appreciated that the target destination may be an external compute device (e.g., another network compute device 106 accessible via the switch 104) or the same network compute device 106 (e.g., another VM 302 or container (not shown) of the network compute device 106). Accordingly, it should be further appreciated that the output network packet includes information and/or characteristics usable to identify the target destination In data flow 404, the VM (1) 302a transmits the output network packet to the VEPA agent 308. In data flow 406, the VEPA agent 308 updates the network packet to include an identifier of the target VM based on the target destination identifying information. It should be appreciated that, for the purposes of the illustrative communication flow 400, the target destination identifying information of the network packet indicates that the network packet is to be hairpinned and identifies which VM 302 the network packet is to be sent to next (e.g., in a series of VMs for running virtual functions in a service chain). In communication flow 408, the VEPA agent 308 transmits the updated network packet to the accelerator device agent 312. Upon receipt, the accelerator device agent 312 forwards the network packet to the VEB hairpin agent 314. In data flow 412, the VEB hairpin agent 314 identifies that the target destination resides on the same host (i.e., the target destination corresponds to another VM on the network compute device 106).

As such, in data flow 414, the VEB hairpin agent 314 returns the network packet to the accelerator device agent 312. In data flow 416, the VEB hairpin agent 314 forwards the network packet to the VEPA agent 308. In data flow 418, the VEPA agent 308 identifies the target VM 302 based on the target destination identifier. As described previously, for the purposes of the illustrative communication flow 400, the target destination identifier corresponds to the IP address of VM (2) 302b. Accordingly, in data flow 420, the VEPA agent 308 transmits the network packet to the identified target VM (i.e., the VM (2) 302b). In data flow 422, the VM (2) 302b performs some packet processing operation on at least a portion of the network packet.

EXAMPLES

Illustrative examples of the technologies disclosed herein are provided below. An embodiment of the technologies may include any one or more, and any combination of, the examples described below.

Example 1 includes a compute device for hairpinning network traffic, the compute device comprising a compute engine to manage a plurality of virtual machines of the compute device; and a network interface controller (NIC) configured to receive, by a virtual Ethernet port aggregator (VEPA) agent of the NIC, a network packet from a first virtual machine of the plurality of virtual machines, wherein the network packet is to be transmitted to a target destination for additional processing; transmit, by the VEPA agent, the received network packet to an agent deployed on an accelerator device of the NIC; forward, by the agent deployed on the accelerator device, the received network packet to a virtual Ethernet bridge (VEB) hairpin agent of the accelerator device; determine, by the VEB hairpin agent, whether the target destination of the network packet corresponds to a second virtual machine of the plurality of virtual machines; and return, by the VEB hairpin agent and in response to a determination that the target destination of the network packet corresponds to the second virtual machine of the plurality of virtual machines, the received network packet to the agent deployed the accelerator device.

Example 2 includes the subject matter of Example 1, and wherein the NIC is further configured to forward, by the agent deployed the accelerator device, the received network packet to the VEPA agent; identify, by the VEPA agent, the second virtual machine; and transmit, by the VEPA agent, the received network packet to the identified second virtual machine.

Example 3 includes the subject matter of any of Examples 1 and 2, and wherein the VEPA agent is further configured to identify, prior to transmission of the network packet to the agent deployed on the accelerator agent, an internet protocol (IP) address corresponding to the target destination; and update at least a portion of the received network packet to include the identified IP address corresponding to the target destination.

Example 4 includes the subject matter of any of Examples 1-3, and wherein to identify the IP address of the target destination comprises to identify the IP address of the second virtual machine, and wherein to identify the second virtual machine comprises to identify the second virtual machine based on the IP address.

Example 5 includes the subject matter of any of Examples 1-4, and wherein to identify the IP address of the second virtual machine comprises to identify the IP address of the second virtual machine based on a flow associated with the received network packet, a workload type associated with the received network packet, an originating source of the received network packet, or an output of a packet processing operation performed on the received network packet.

Example 6 includes the subject matter of any of Examples 1-5, and further including a driver to configure the VEB hairpin agent.

Example 7 includes the subject matter of any of Examples 1-6, and wherein the driver is further configured to operate in VEPA mode.

Example 8 includes the subject matter of any of Examples 1-7, and wherein the VEPA agent is included in a MAC of the NIC.

Example 9 includes the subject matter of any of Examples 1-8, and wherein the VEB hairpin agent is further to receive an indication that each of the plurality of virtual machines has been instantiated, wherein the indication includes a corresponding IP address, and wherein to determine whether the target destination of the network packet corresponds to another virtual machine of the plurality of virtual machines presently executing on the network compute device comprises to make the determination as a function of an internet protocol (IP) address of the received network packet.

Example 10 includes one or more machine-readable storage media comprising a plurality of instructions stored thereon that, in response to being executed, cause a compute device to receive, by a virtual Ethernet port aggregator (VEPA) agent of a media access control (MAC) of a network interface controller (NIC), a network packet from a first virtual machine of a plurality of virtual machines of the compute device, wherein the network packet is to be transmitted to a target destination for additional processing; transmit, by the VEPA agent, the received network packet to an agent deployed on an accelerator device of the NIC; forward, by the agent deployed on the accelerator device, the received network packet to a virtual Ethernet bridge (VEB) hairpin agent of the accelerator device; determine, by the VEB hairpin agent, whether a target destination of the network packet corresponds to a second virtual machine of the plurality of virtual machines; and return, by the VEB hairpin agent and in response to a determination that the target destination of the network packet corresponds to the second virtual machine of the plurality of virtual machines, the received network packet to the agent deployed the accelerator device.

Example 11 includes the subject matter of Example 10, and wherein the compute device is further to forward, by the agent deployed the accelerator device, the received network packet to the VEPA agent; identify, by the VEPA agent, the second virtual machine; and transmit, by the VEPA agent, the received network packet to the identified second virtual machine.

Example 12 includes the subject matter of any of Examples 10 and 11, and wherein the VEPA agent is further to identify, prior to transmission of the network packet to the agent deployed on the accelerator agent, an internet protocol (IP) address corresponding to the target destination; and update at least a portion of the received network packet to include the identified IP address corresponding to the target destination.

Example 13 includes the subject matter of any of Examples 10-12, and wherein to identify the IP address of the target destination comprises to identify the IP address of the second virtual machine, and wherein to identify the second virtual machine comprises to identify the second virtual machine based on the IP address.

Example 14 includes the subject matter of any of Examples 10-13, and wherein to identify the IP address of the second virtual machine comprises to identify the IP address of the second virtual machine based on a flow associated with the received network packet, a workload type associated with the received network packet, an originating source of the received network packet, or an output of a packet processing operation performed on the received network packet.

Example 15 includes the subject matter of any of Examples 10-14, and wherein the plurality of instructions further cause the compute device to configure the VEB hairpin agent via a driver of the compute device.

Example 16 includes the subject matter of any of Examples 10-15, and wherein the driver is further to operate in VEPA mode.

Example 17 includes the subject matter of any of Examples 10-16, and wherein the VEB hairpin agent is further to receive an indication that each of the plurality of virtual machines has been instantiated, wherein the indication includes a corresponding IP address, and wherein to determine whether the target destination of the network packet corresponds to another virtual machine of the plurality of virtual machines presently executing on the network compute device comprises to make the determination as a function of an internet protocol (IP) address of the received network packet.

Example 18 includes a network interface controller (NIC), the NIC comprising accelerator device circuitry; and media access control (MAC) circuitry configured to receive, by a virtual Ethernet port aggregator (VEPA) agent deployed on the MAC circuitry, a network packet from a first virtual machine of the plurality of virtual machines, wherein the network packet is to be transmitted to a target destination for additional processing, and transmit the received network packet to an agent deployed on the accelerator device circuitry of the NIC, wherein the accelerator device circuitry is configured to forward, by the agent deployed on the accelerator device circuitry, the received network packet to a virtual Ethernet bridge (VEB) hairpin agent of the accelerator device circuitry, determine, by the VEB hairpin agent, whether the target destination of the network packet corresponds to a second virtual machine of the plurality of virtual machines, and return, by the VEB hairpin agent and in response to a determination that the target destination of the network packet corresponds to the second virtual machine of the plurality of virtual machines, the received network packet to the agent deployed the accelerator device.

Example 19 includes the subject matter of Example 18, and wherein the accelerator device circuitry is further configured to forward, by the agent, the received network packet to the VEPA agent, and wherein the MAC circuitry is further to (i) identify, by the VEPA agent, the second virtual machine and (ii) transmit, by the VEPA agent, the received network packet to the identified second virtual machine.

Example 20 includes the subject matter of any of Examples 18 and 19, and wherein the accelerator device circuitry is further configured to identify, by the VEPA agent and prior to transmission of the network packet to the agent deployed on the accelerator agent, an internet protocol (IP) address corresponding to the target destination; and update, by the VEPA agent, at least a portion of the received network packet to include the identified IP address corresponding to the target destination.

Example 21 includes the subject matter of any of Examples 18-20, and wherein to identify the IP address of the target destination comprises to identify the IP address of the second virtual machine, wherein to identify the second virtual machine comprises to identify the second virtual machine based on the IP address, and wherein to identify the IP address of the second virtual machine comprises to identify the IP address of the second virtual machine based on one of a flow associated with the received network packet, a workload type associated with the received network packet, an originating source of the received network packet, or an output of a packet processing operation performed on the received network packet.

Example 22 includes network interface controller (NIC), the NIC comprising means for receiving, by a virtual Ethernet port aggregator (VEPA) agent of the NIC, a network packet from a first virtual machine of a plurality of virtual machines of the compute device, wherein the network packet is to be transmitted to a target destination for additional processing; means for transmitting, by the VEPA agent, the received network packet to an agent deployed on an accelerator device of the NIC; means for forwarding, by the agent deployed on the accelerator device, the received network packet to a virtual Ethernet bridge (VEB) hairpin agent of the accelerator device; means for determining, by the VEB hairpin agent, whether a target destination of the network packet corresponds to a second virtual machine of the plurality of virtual machines; and means for returning, by the VEB hairpin agent and in response to a determination that the target destination of the network packet corresponds to the second virtual machine of the plurality of virtual machines, the received network packet to the agent deployed the accelerator device.

Example 23 includes the subject matter of Example 22, and further including means for forwarding, by the agent deployed the accelerator device, the received network packet to the VEPA agent; means for identifying, by the VEPA agent, the second virtual machine; and means for transmitting, by the VEPA agent, the received network packet to the identified second virtual machine.

Example 24 includes the subject matter of any of Examples 22 and 23, and further including means for identifying, by the VEPA agent and prior to transmission of the network packet to the agent deployed on the accelerator agent, an internet protocol (IP) address corresponding to the target destination; and means for updating, by the VEPA agent at least a portion of the received network packet to include the identified IP address corresponding to the target destination.

Example 25 includes the subject matter of any of Examples 18-24, and further including means for receiving, by the VEB hairpin agent, an indication that each of the plurality of virtual machines has been instantiated, wherein the indication includes a corresponding IP address, and wherein the means for determining whether the target destination of the network packet corresponds to another virtual machine of the plurality of virtual machines presently executing on the network compute device comprises means for making the determination as a function of an internet protocol (IP) address of the received network packet.

The invention claimed is:

1. An apparatus comprising:
and
　a network interface controller (NIC) configured to:
　　receive, by a virtual Ethernet port aggregator (VEPA) agent of the NIC, a network packet from a first virtual machine of a plurality of virtual machines, wherein the network packet is to be transmitted to a target destination for additional processing;
　　transmit, by the VEPA agent, the received network packet to an agent deployed on an accelerator device of the NIC;
　　forward, by the agent deployed on the accelerator device, the received network packet to a virtual Ethernet bridge (VEB) hairpin agent of the accelerator device;
　　determine, by the VEB hairpin agent, whether the target destination of the network packet corresponds to a second virtual machine of the plurality of virtual machines; and
　　return, by the VEB hairpin agent and in response to a determination that the target destination of the network packet corresponds to the second virtual machine of the plurality of virtual machines, the received network packet to the agent deployed on the accelerator device.

2. The apparatus of claim 1, wherein the NIC is further configured to:
　forward, by the agent deployed on the accelerator device, the received network packet to the VEPA agent;
　identify, by the VEPA agent, the second virtual machine; and
　transmit, by the VEPA agent, the received network packet to the identified second virtual machine.

3. The apparatus of claim 1, wherein the VEPA agent is further configured to:
　identify, prior to transmission of the network packet to the agent deployed on the accelerator agent, an internet protocol (IP) address corresponding to the target destination; and
　update at least a portion of the received network packet to include the identified IP address corresponding to the target destination.

4. The apparatus of claim 3, wherein to identify the IP address of the target destination comprises to identify the IP address of the second virtual machine, and wherein to identify the second virtual machine comprises to identify the second virtual machine based on the IP address.

5. The apparatus of claim 4, wherein to identify the IP address of the second virtual machine comprises to identify the IP address of the second virtual machine based on a flow associated with the received network packet, a workload type associated with the received network packet, an originating source of the received network packet, or an output of a packet processing operation performed on the received network packet.

6. The apparatus of claim 1, further comprising a driver to configure the VEB hairpin agent.

7. The apparatus of claim 6, wherein the driver is further configured to operate in VEPA mode.

8. The apparatus of claim 1, wherein the VEPA agent is included in a MAC of the NIC.

9. The apparatus of claim 1, wherein the VEB hairpin agent is further to receive an indication that each of the plurality of virtual machines has been instantiated, wherein the indication includes a corresponding IP address, and wherein to determine whether the target destination of the network packet corresponds to another virtual machine of the plurality of virtual machines presently executing on a compute device comprises to make the determination as a function of an internet protocol (IP) address of the received network packet.

10. One or more non-transitory machine-readable storage media comprising a plurality of instructions stored thereon that, in response to being executed, cause a network interface controller (NIC) device to:
　receive, by a virtual Ethernet port aggregator (VEPA) agent of a media access control (MAC) of the network interface controller (NIC), a network packet from a first virtual machine of a plurality of virtual machines, wherein the network packet is to be transmitted to a target destination for additional processing;
　transmit, by the VEPA agent, the received network packet to an agent deployed on an accelerator device of the NIC;
　forward, by the agent deployed on the accelerator device, the received network packet to a virtual Ethernet bridge (VEB) hairpin agent of the accelerator device;
　determine, by the VEB hairpin agent, whether a target destination of the network packet corresponds to a second virtual machine of the plurality of virtual machines; and
　return, by the VEB hairpin agent and in response to a determination that the target destination of the network packet corresponds to the second virtual machine of the plurality of virtual machines, the received network packet to the agent deployed on the accelerator device.

11. The one or more non-transitory machine-readable storage media of claim 10, wherein the network interface controller (NIC) device is further to:

forward, by the agent deployed on the accelerator device, the received network packet to the VEPA agent;

identify, by the VEPA agent, the second virtual machine; and transmit, by the VEPA agent, the received network packet to the identified second virtual machine.

12. The one or more non-transitory machine-readable storage media of claim 10, wherein the VEPA agent is further to:

identify, prior to transmission of the network packet to the agent deployed on the accelerator agent, an internet protocol (IP) address corresponding to the target destination; and update at least a portion of the received network packet to include the identified IP address corresponding to the target destination.

13. The one or more non-transitory machine-readable storage media of claim 12, wherein to identify the IP address of the target destination comprises to identify the IP address of the second virtual machine, and wherein to identify the second virtual machine comprises to identify the second virtual machine based on the IP address.

14. The one or more non-transitory machine-readable storage media of claim 13, wherein to identify the IP address of the second virtual machine comprises to identify the IP address of the second virtual machine based on a flow associated with the received network packet, a workload type associated with the received network packet, an originating source of the received network packet, or an output of a packet processing operation performed on the received network packet.

15. The one or more non-transitory machine-readable storage media of claim 10, wherein the plurality of instructions further cause a compute device to configure the VEB hairpin agent via a driver of the compute device.

16. The one or more non-transitory machine-readable storage media of claim 15, wherein the driver is further to operate in VEPA mode.

17. The one or more non-transitory machine-readable storage media of claim 10, wherein the VEB hairpin agent is further to receive an indication that each of the plurality of virtual machines has been instantiated, wherein the indication includes a corresponding IP address, and wherein to determine whether the target destination of the network packet corresponds to another virtual machine of the plurality of virtual machines presently executing on a compute device comprises to make the determination as a function of an internet protocol (IP) address of the received network packet.

18. A network interface controller (NIC), the NIC comprising:

accelerator device circuitry; and media access control (MAC) circuitry configured to:

receive, by a virtual Ethernet port aggregator (VEPA) agent deployed on the MAC circuitry, a network packet from a first virtual machine of a plurality of virtual machines, wherein the network packet is to be transmitted to a target destination for additional processing, and transmit the received network packet to an agent deployed on the accelerator device circuitry of the NIC, wherein the accelerator device circuitry is configured to:

forward, by the agent deployed on the accelerator device circuitry, the received network packet to a virtual Ethernet bridge (VEB) hairpin agent of the accelerator device circuitry, determine, by the VEB hairpin agent, whether the target destination of the network packet corresponds to a second virtual machine of the plurality of virtual machines, and return, by the VEB hairpin agent and in response to a determination that the target destination of the network packet corresponds to the second virtual machine of the plurality of virtual machines, the received network packet to the agent deployed on the accelerator device.

19. The NIC of claim 18, wherein the accelerator device circuitry is further configured to forward, by the agent, the received network packet to the VEPA agent, and wherein the MAC circuitry is further to (i) identify, by the VEPA agent, the second virtual machine and (ii) transmit, by the VEPA agent, the received network packet to the identified second virtual machine.

20. The NIC of claim 18, wherein the accelerator device circuitry is further configured to:

identify, by the VEPA agent and prior to transmission of the network packet to the agent deployed on the accelerator agent, an internet protocol (IP) address corresponding to the target destination; and update, by the VEPA agent, at least a portion of the received network packet to include the identified IP address corresponding to the target destination.

21. The NIC of claim 20, wherein to identify the IP address of the target destination comprises to identify the IP address of the second virtual machine, wherein to identify the second virtual machine comprises to identify the second virtual machine based on the IP address, and wherein to identify the IP address of the second virtual machine comprises to identify the IP address of the second virtual machine based on one of a flow associated with the received network packet, a workload type associated with the received network packet, an originating source of the received network packet, or an output of a packet processing operation performed on the received network packet.

22. A network interface controller (NIC), the NIC comprising:

means for receiving, by a virtual Ethernet port aggregator (VEPA) agent of the NIC, a network packet from a first virtual machine of a plurality of virtual machines of a compute device, wherein the network packet is to be transmitted to a target destination for additional processing;

means for transmitting, by the VEPA agent, the received network packet to an agent deployed on an accelerator device of the NIC;

means for forwarding, by the agent deployed on the accelerator device, the received network packet to a virtual Ethernet bridge (VEB) hairpin agent of the accelerator device;

means for determining, by the VEB hairpin agent, whether a target destination of the network packet corresponds to a second virtual machine of the plurality of virtual machines; and means for returning, by the VEB hairpin agent and in response to a determination that the target destination of the network packet corresponds to the second virtual machine of the plurality of virtual machines, the received network packet to the agent deployed on the accelerator device.

23. The NIC of claim 22, further comprising:
- means for forwarding, by the agent deployed on the accelerator device, the received network packet to the VEPA agent;
- means for identifying, by the VEPA agent, the second virtual machine; and
- means for transmitting, by the VEPA agent, the received network packet to the identified second virtual machine.

24. The apparatus of claim 23, further comprising:
- means for identifying, by the VEPA agent and prior to transmission of the network packet to the agent deployed on the accelerator agent, an internet protocol (IP) address corresponding to the target destination; and
- means for updating, by the VEPA agent at least a portion of the received network packet to include the identified IP address corresponding to the target destination.

25. The apparatus of claim 23, further comprising means for receiving, by the VEB hairpin agent, an indication that each of the plurality of virtual machines has been instantiated, wherein the indication includes a corresponding IP address, and wherein the means for determining whether the target destination of the network packet corresponds to another virtual machine of the plurality of virtual machines presently executing on a compute device comprises means for making the determination as a function of an internet protocol (IP) address of the received network packet.

26. The apparatus of claim 1, comprising:
- a compute engine to manage the plurality of virtual machines of the compute device.

* * * * *